(12) United States Patent
Ooga et al.

(10) Patent No.: US 11,318,612 B2
(45) Date of Patent: May 3, 2022

(54) CONTROL DEVICE, CONTROL METHOD, AND STORAGE MEDIUM

(71) Applicant: Kabushiki Kaisha Toshiba, Minato-ku (JP)

(72) Inventors: Junichiro Ooga, Kawasaki (JP); Akihito Ogawa, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 365 days.

(21) Appl. No.: 16/285,263

(22) Filed: Feb. 26, 2019

(65) Prior Publication Data

US 2020/0061819 A1 Feb. 27, 2020

(30) Foreign Application Priority Data

Aug. 9, 2018 (JP) .............................. JP2018-150220

(51) Int. Cl.
*B25J 9/16* (2006.01)
*G06F 9/30* (2018.01)

(52) U.S. Cl.
CPC .......... *B25J 9/1664* (2013.01); *G06F 9/3004* (2013.01); *G05B 2219/40* (2013.01)

(58) Field of Classification Search
CPC .............. G06F 9/3004; G05B 19/0421; G05B 2219/40; B25J 9/1664
See application file for complete search history.

(56) References Cited

U.S. PATENT DOCUMENTS

| 4,517,652 A * | 5/1985 | Bennett ................. | B25J 9/1692 |
| | | | 318/568.1 |
| 9,687,982 B1 * | 6/2017 | Jules ........................ | B25J 9/161 |

(Continued)

FOREIGN PATENT DOCUMENTS

| JP | 2003-266345 | 9/2003 |
| JP | 3751309 | 12/2005 |

(Continued)

OTHER PUBLICATIONS

Noriko Ohnishi, et al. "Mitsubishi Portable Manipulator DEBUT!—A Proposal of Open-Architecture Robot System" Journal of the Robotics Society of Japan, vol. 12, No. 8, Nov. 15, 1994, pp. 59-64 (with Machine translation prepared by Google Translator on Jun. 10, 2021).

*Primary Examiner* — Stephen Holwerda

(74) *Attorney, Agent, or Firm* — Oblon, McClelland, Maier & Neustadt, L.L.P.

(57) ABSTRACT

A control device includes at least two processors comprising at least a first processor and a second processor. The control device controls at least one autonomous motion mechanism on the basis of a recognition result received from a recognition device. A storage device of the control device stores upper-level software, middle-level software, and lower-level software. The upper-level software derives a feature amount representing a feature of the recognition result. The middle-level software generates a motion plan of the autonomous motion mechanism on the basis of the feature amount. The lower-level software outputs a command value for controlling the autonomous motion mechanism on the basis of the motion plan. The first processor executes at least the upper-level software, the second processor executes at least the lower-level software, and at least one processor included in the control device executes the middle-level software.

9 Claims, 12 Drawing Sheets

(56) References Cited

U.S. PATENT DOCUMENTS

| | | | |
|---|---|---|---|
| 2004/0017937 A1* | 1/2004 | Silverstein | B25J 9/1697 382/153 |
| 2011/0054684 A1* | 3/2011 | Seo | G05B 19/0421 700/248 |
| 2011/0218675 A1* | 9/2011 | Ban | B25J 9/1697 700/259 |
| 2016/0078583 A1* | 3/2016 | Nishitani | G06T 7/73 700/259 |
| 2016/0184995 A1* | 6/2016 | Uchiyama | G06T 7/73 700/259 |
| 2016/0221193 A1 | 8/2016 | Sato | |
| 2018/0243915 A1* | 8/2018 | Hashimoto | B25J 9/0081 |
| 2019/0091869 A1* | 3/2019 | Yamazaki | B25J 9/1697 |

FOREIGN PATENT DOCUMENTS

| | | |
|---|---|---|
| JP | 2013-127670 | 6/2013 |
| JP | 2015-217489 | 12/2015 |
| JP | 2016-144861 | 8/2016 |

* cited by examiner

CONTROL DEVICE, CONTROL METHOD, AND STORAGE MEDIUM

CROSS-REFERENCE TO RELATED APPLICATION

Priority is claimed on Japanese Patent Application No. 2018-150220, filed Aug. 9, 2018, the content of which is incorporated herein by reference.

BACKGROUND

Field of the Invention

An embodiment of the present invention relates to a control device, a control method, and a storage medium.

Description of Related Art

A general-purpose controller, which controls the position, orientation, and the like of a robot on the basis of recognition results from external recognition devices (for example, information on images captured by cameras or sensing results from sensors), is provided by robot manufacturers and the like. The general-purpose controller accepts the input of feedback information obtained from image recognition results, sensing results and the like only at a fixed time period (for example, 30 [milliseconds]) in many cases.

In such a general-purpose controller, even when the performance of the external recognition devices is improved such that the feedback information of the external recognition devices is output at a higher frequency, there are cases where it is not possible to change a time period at which the general-purpose controller accepts the recognition results from external recognition devices. In such a case, in a situation in which high real-time characteristics are required, there are cases where it is not possible to quickly reflect the latest recognition results or sensing results in a command value output from the general-purpose controller to the robot. As a consequence, there are cases where control stability obtained by flexibly reflecting high frequency feedback information of the external recognition devices is not obtained. Moreover, in the related general-purpose controller, since it is difficult to modify software due to problems of compatibility and the like, there are cases where maintainability is not sufficient.

SUMMARY

The present invention has been made to solve the aforementioned problems, and an object of the present invention is to provide a control device, a control method, and a storage medium, by which more robust stability and maintainability are achieved.

A control device of an embodiment includes at least two processors comprising at least a first processor and a second processor. The control device controls at least one autonomous motion mechanism on the basis of a recognition result received from a recognition device. A storage device of the control device stores upper-level software, middle-level software, and lower-level software. The upper-level software derives a feature amount representing a feature of the recognition result. The middle-level software generates a motion plan of the autonomous motion mechanism on the basis of the feature amount. The lower-level software outputs a command value for controlling the autonomous motion mechanism on the basis of the motion plan. The first processor executes at least the upper-level software, the second processor executes at least the lower-level software, and at least one processor included in the control device executes the middle-level software.

DETAILED DESCRIPTION OF THE INVENTION

Hereinafter, a control device, a control method, and a storage medium of an embodiment will be described with reference to the drawings.

First Embodiment

Figure 1:
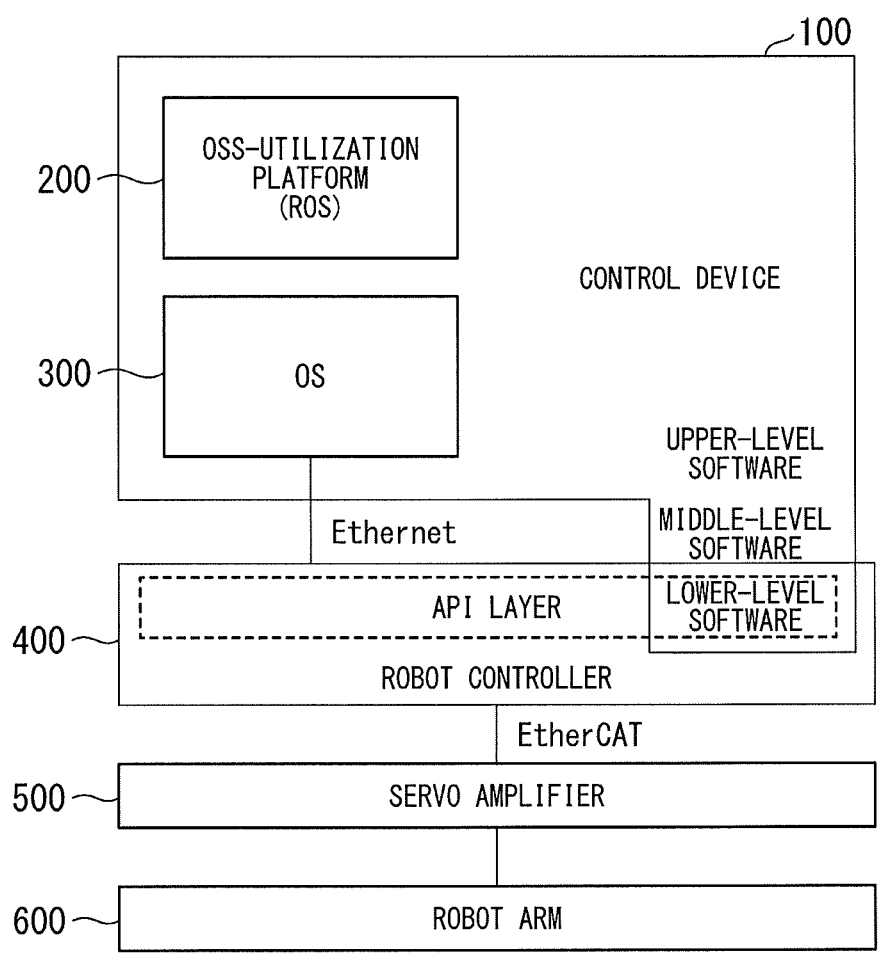
FIG. 1 is a schematic diagram illustrating a usage environment of a control device 100 of a first embodiment.

FIG. 1 is a schematic diagram illustrating a usage environment of a control device 100 of a first embodiment. Hereinafter, an example in which an autonomous motion mechanism controlled by the control device 100 is a robot arm device 600 will be described.

The robot arm device 600, for example, is controlled by the control device 100, an open source software (OSS)-utilization platform 200, an operating system (OS) 300, a robot controller 400, and a servo amplifier 500 in cooperation. The control device 100, the OSS-utilization platform 200, and the OS 300 are opened in a memory such that they can be executed by at least one processor (for example, a central calculation control device or a central processing unit (CPU)). The robot controller 400 may be logically opened in the same device as the OSS-utilization platform 200 and the OS 300, or may be logically opened in a device different from the OSS-utilization platform 200 and the OS 300.

The control device 100, for example, stores lower-level software (a lower-level program), which generates a command value of a robot via an application programming interface (API) layer, middle-level software (a middle-level program), which corresponds to a layer of a higher level than the lower-level software and generates a motion planning script and the like of the robot to be controlled, and upper-level software (a upper-level program), which corresponds to a layer of a higher level than the middle-level software and derives a feature amount and the like from a recognition result of an external recognition device, in a storage device of the OSS-utilization platform 200.

For example, in a situation in which an instruction to move an object B to a point A is given to the robot arm device 600, the upper-level software of the control device 100 derives a feature amount from a recognition result obtained by recognizing the point A or the object by a recognition device such as a camera and outputs the feature amount to the middle-level software. On the basis of the feature amount output from the upper-level software, the middle-level software generates a plan such as a trajectory for the robot arm device 600 to move the object B to the point A. The plan such as the trajectory includes a movement speed of the robot arm device 600, an angle of joint parts of the robot arm device 600, a position at which a grasping member (a hand) of the robot arm device 600 is brought into contact with the object B, an amount of pressure applied by the grasping member to the object B, and the like. The middle-level software outputs the generated motion plan to the lower-level software as a motion planning script. On the basis of the motion planning script output by the middle-level software, the lower-level software generates detailed motion command values for each part of the robot arm device 600. The control device 100 completes an output command to the OSS-utilization platform 200 and the robot controller 400 by the upper-level software, the middle-level software, and the lower-level software.

The OSS-utilization platform 200, for example, is general-purpose middleware for autonomous control robot programming that can be executed on the OS 300, such as ROS (Robot Operating System). The OSS-utilization platform 200 generates original information of a motion command of the robot arm device 600 and outputs the original information to the robot controller 400 according to the Ethernet (registered trademark) standard of the OS 300. The original information of the motion command, for example, is a recognition result of an external recognition device (not illustrated) such as a camera or a feature amount derived from the recognition result. The OS 300, for example, Linux (registered trademark).

The robot controller 400 generates a motion command value on the basis of the original information of the motion command output by the OSS-utilization platform 200. The robot controller 400, for example, outputs the generated motion command value to the robot arm device 600 according to the Ethernet for control automation technology (EthernetCAT; industrial open network; registered trademark) standard. Furthermore, the robot controller 400 may output the generated motion command value to the robot arm device 600 according to a communication standard (or analog output) prescribed by a manufacturer of the robot arm device 600. The robot controller 400, for example, is provided by the manufacturer and the like of the robot arm device 600, and a trajectory in accordance with a generation rule recommended (or guaranteed) by the manufacturer is generated.

Figure 2:
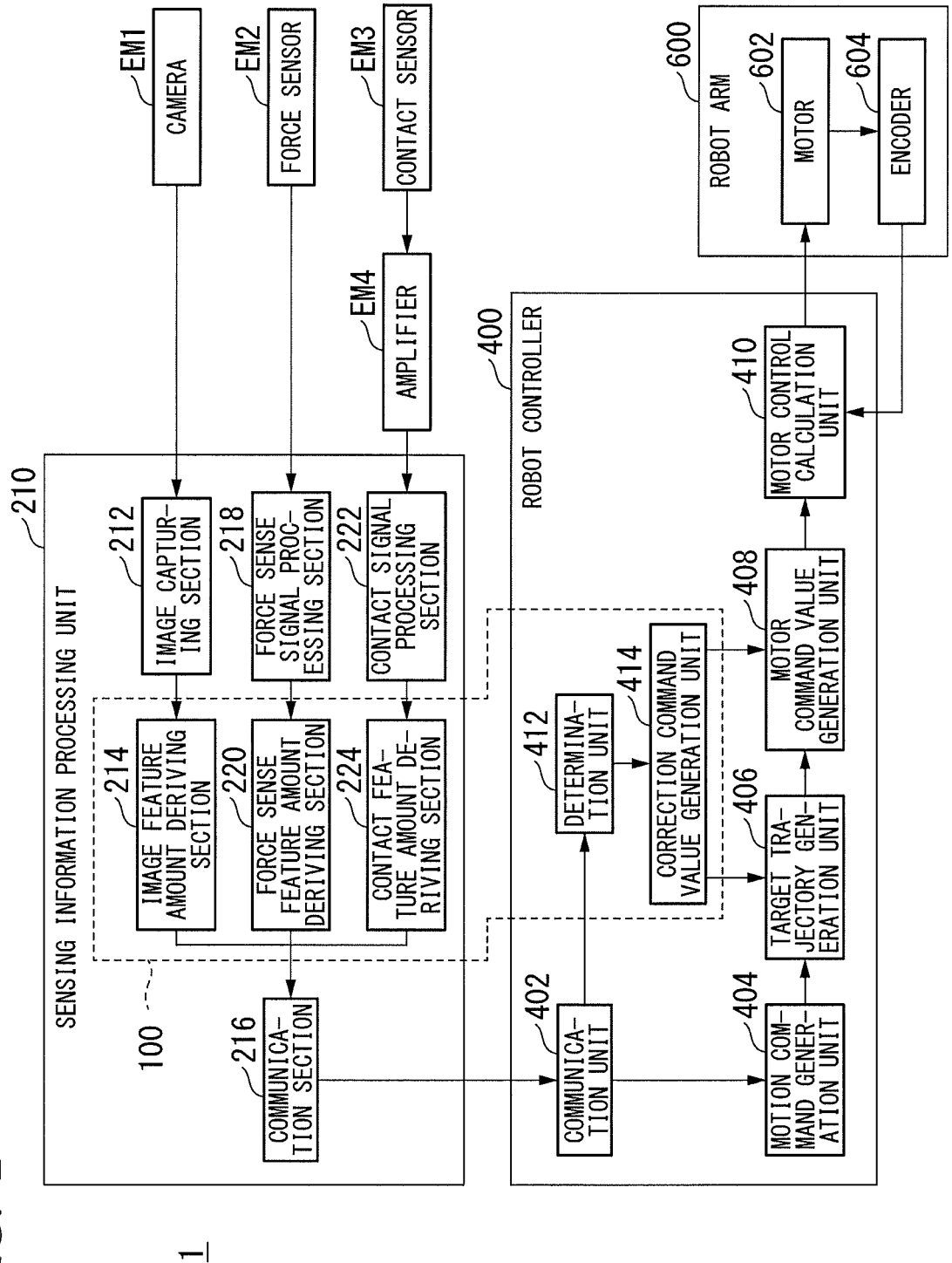
FIG. 2 is a block diagram illustrating an example of a configuration of a control system 1 of a first embodiment.

FIG. 2 is a block diagram illustrating an example of a configuration of a control system 1 of the first embodiment. The control system 1, for example, includes a camera EM1, a force sensor EM2, a contact sensor EM3, an amplifier EM4, a sensing information processing unit 210, at least one pair of robot controllers 400, and the robot arm device 600.

The camera EM1, for example, recognizes an image of an object to be grasped by the robot arm device 600 (for example, an article to be picked up by the robot arm device 600). The camera EM1 may be disposed at a position at which it can recognize a object to be grasped in bird's eye view or may also be disposed at a position at which it can recognize a object to be grasped in the periphery and the like of the grasping member of the robot arm device 600 at a short distance. The camera EM1 outputs a recognition result (imaging data) to the sensing information processing unit 210. Furthermore, the force sensor EM2 is installed at a distal end of the grasping member of the robot arm device 600 and recognizes a pushing force component and a moment component applied to the object to be grasped by the robot arm device 600 on six axes. Similarly to the camera EM1, the force sensor EM2 outputs a recognition result to the sensing information processing unit 210. Furthermore, the contact sensor EM3 is installed at the distal end and the like of the grasping member of the robot arm device 600 and recognizes the contact feeling. The contact sensor EM3 outputs a recognition result to the amplifier EM4. The amplifier EM4 generates a contact recognition result of the object to be grasped on the basis of the recognition result output by the contact sensor EM3, and outputs the contact recognition result to the sensing information processing unit 210. The amplifier EM4, for example, has a function of a low pass filter. The amplifier EM4 generates the contact recognition result by performing processing such as removing noise from the recognition result of the contact sensor EM3 and amplifying the recognition result. The camera EM1, the force sensor EM2, and the amplifier EM4 each operate at predetermined time intervals.

The sensing information processing unit 210, for example, includes an image capturing section 212, an image feature amount deriving section 214, a communication section 216, a force sense signal processing section 218, a force sense feature amount deriving section 220, a contact signal processing section 222, and a contact feature amount deriving section 224. These functional units are implemented by the upper-level software executed on the OSS-utilization platform 200 illustrated in FIG. 1. The image capturing section 212, the force sense signal processing section 218, and the contact signal processing section 222 are examples of an "accepting unit".

The image capturing section 212 captures the recognition result output by the camera EM1 and outputs the recognition result to the image feature amount deriving section 214. The image capturing section 212 may select some of the imaging data, which is the recognition result of the camera EM1, and output the selected imaging data to the image feature amount deriving section 214, or may output all of the imaging data to the image feature amount deriving section 214. The image feature amount deriving section 214 derives an image feature amount on the basis of the recognition result output by the image capturing section 212. The image feature amount is an amount representing the feature of the object to be grasped derived from the imaging data imaged by the camera EM1. The image feature amount, for example, is obtained by digitizing or vectorizing an approximate center position, color distribution, luminance gradient pattern distribution and the like on the image of the object to be grasped. The image feature amount deriving section 214 outputs the derived image feature amount to the communication section 216.

The force sense signal processing section 218 accepts the recognition result output by the force sensor EM2 and outputs some or all of the recognition result to the force sense feature amount deriving section 220. The force sense feature amount deriving section 220 derives a force sense feature amount on the basis of the recognition result output by the force sense signal processing section 218. The force sense feature amount is obtained by digitizing or vectorizing the position of the force sensor EM2, force detected by the force sensor EM2, and the like. The force sense feature amount deriving section 220 outputs the derived force sense feature amount to the communication section 216.

The contact signal processing section 222 accepts the contact recognition result output by the amplifier EM4 and outputs some or all of the contact recognition result to the contact feature amount deriving section 224. The contact feature amount deriving section 224 derives a contact feature amount on the basis of the contact recognition result output by the contact signal processing section 222. The contact feature amount is obtained by digitizing the recognition result sensed by the contact sensor EM3. The contact feature amount deriving section 224 outputs the derived contact feature amount to the communication section 216.

The communication section 216 outputs, to the robot controller 400, the image feature amount output by the image feature amount deriving section 214, the force sense feature amount output by the force sense feature amount deriving section 220, and the contact feature amount output by the contact feature amount deriving section 224. The communication section 216 may output the image feature amount, the force sense feature amount, and the contact feature amount to the robot controller 400 all together, or may also output the image feature amount, the force sense feature amount, and the contact feature amount to the robot controller 400 each time the respective feature amounts are received. The communication from the communication section 216 to the robot controller 400, for example, is performed through Ethernet via the OS 300 or API provided by the OSS-utilization platform 200.

The robot controller 400, for example, includes a communication unit 402, a motion command generation unit 404, a target trajectory generation unit 406, a motor command value generation unit 408, and a motor control calculation unit 410. Furthermore, the robot controller 400 includes a determination unit 412 and a correction command value generation unit 414. The motor command value generation unit 408 is an example of a "command value generation unit" and the determination unit 412 is an example of a "control unit".

The communication unit 402 receives the image feature amount, the force sense feature amount, and the contact feature amount transmitted by the sensing information processing unit 210, and outputs the received feature amounts to the motion command generation unit 404 or the correction command value generation unit 414. The motion command generation unit 404 generates the motion command of the robot arm device 600 on the basis of the image feature amount, the force sense feature amount, and the contact feature amount output by the communication unit 402. The motion command, for example, is a motion script that is executed in the entire robot arm device 600. The motion script includes information on the three-axis coordinates of a target point.

The motion command generation unit 404 outputs the generated motion command to the target trajectory generation unit 406. The target trajectory generation unit 406 generates a target trajectory of a representative point of the robot arm device 600 (for example, a distal part or a joint part of the robot arm device 600) on the basis of the motion command output by the motion command generation unit 404. The target trajectory, for example, is set such that a trajectory through which the robot arm device 600 passes is a trajectory that avoids obstacles.

The target trajectory generation unit 406 outputs the generated target trajectory to the motor command value generation unit 408. On the basis of the target trajectory output by the target trajectory generation unit 406, the motor command value generation unit 408 generates a command value (an example of a lower-level command value) of each motor to follow the target trajectory. The command value of each motor generated by the motor command value generation unit 408, for example, includes a command related to a position or a speed. The motor command value generation unit 408 outputs the generated command value to the robot arm device 600. The motor command value generation unit 408, for example, outputs the command value at a predetermined interval.

The determination unit 412 determines whether a correction command value is to be generated. For example, when the motion command generation unit 404 generates the motion command and then the command value of each motor generated by the motor command value generation unit 408 is not output to the robot arm device 600, the determination unit 412 determines that the correction command value is to be generated and outputs a control command related to the generation of the correction command value to the correction command value generation unit 414. The correction command value generated by the correction command value generation unit 414 may be information indicating a correction direction or a correction amount, or information for replacing original information (the motion command or the target trajectory). In the latter case, when the correction command value for the motion command has been generated, the correction command value generation unit 414 outputs the correction command value to the target trajectory generation unit 406 and replaces the output command value with the correction command value. Furthermore, when the correction command value of the target trajectory has been generated, the correction command value generation unit 414 outputs the correction command value to the motor command value generation unit 408 and replaces the output command value with the correction command value.

When the correction command value is output by the correction command value generation unit 414, the target trajectory generation unit 406 corrects the target trajectory on the basis of the correction command value and outputs the corrected target trajectory to the motor command value generation unit 408. The motor command value generation unit 408 corrects the motor command value on the basis of the corrected target trajectory and outputs the corrected motor command value to the motor control calculation unit 410. The motor control calculation unit 410 outputs a command value for controlling the robot arm device 600 on the basis of the corrected motor command value. In addition, even when the correction command value is output to the motor command value generation unit 408 by the correction command value generation unit 414, the robot arm device 600 is controlled on the basis of the correction command value in the same manner. The communication from the motor control calculation unit 410 to the robot arm device 600, for example, may be performed through the Ethernet via the OS 300 or the API provided by the OSS-utilization platform 200, or may be performed according to a communication standard prescribed by the manufacturer of the robot arm device 600; however, it is preferably performed according to the EthernetCAT standard.

In addition, the determination unit 412 determines whether the correction command value should be generated in accordance with timings at which various command values are output to the robot arm device 600 by the robot controller 400. For example, the determination unit 412 performs no process of generating the correction command value when the motion command generation unit 404 generates no motion command. This is because the same command values as various command values generated by the motion command generation unit 404 and the target trajectory generation unit 406 are output.

The robot arm device 600, for example, includes a motor 602 and an encoder 604. The motor 602 operates on the basis of the command value transmitted by the robot controller 400. The encoder 604 outputs feedback information on a position, a speed, an angle and the like of the motor 602 to the motor control calculation unit 410. The encoder 604, for example, transmits pulse waves (a phase A, a phase B, and in some cases a phase Z) in a parallel manner as the feedback information. Furthermore, the encoder 604 may transmit the feedback information by using a serial transmission scheme.

Although FIG. 2 illustrates an example in which the motor control calculation unit 410 is an element of the robot controller 400, the motor control calculation unit 410 may be configured as a driver of the robot controller 400. An example in which the motor control calculation unit 410 is configured as a driver will be described later using FIG. 6.

Figure 3:
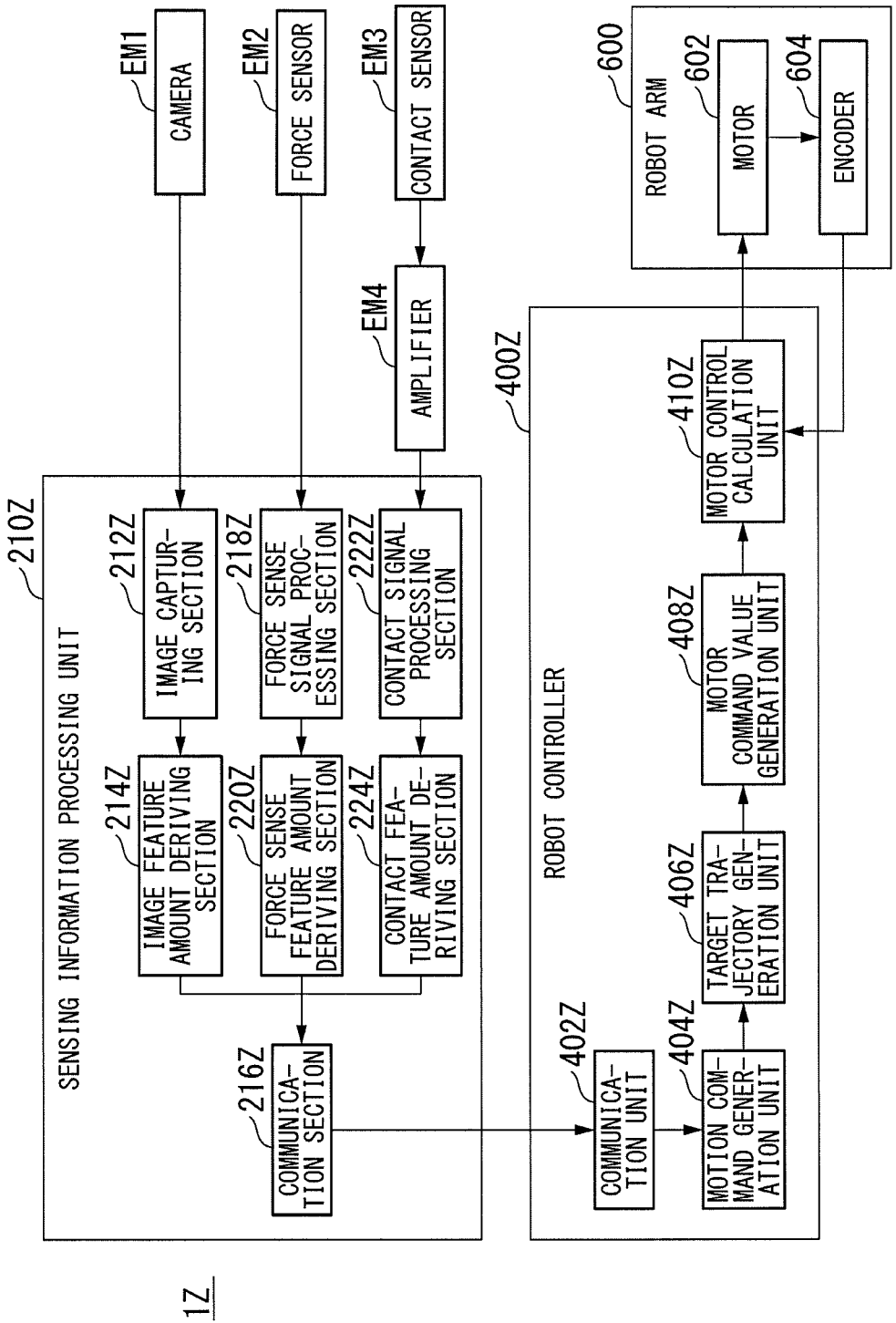
FIG. 3 is a block diagram illustrating an example of a configuration of a related control system 1Z.

Hereinafter, a comparison with a comparative example will be described. FIG. 3 is a block diagram illustrating an example of a configuration of a control system 1Z of the comparative example. In the following description, elements having the same functions as the content described in the control device 100 of the first embodiment are denoted by the same names and reference numerals, and a detailed description of the functions will be omitted.

In the control system 1Z illustrated in FIG. 3, the determination unit 412 and the correction command value generation unit 414 of the control system 1 of the first embodiment illustrated in FIG. 2 are omitted. Therefore, even when a recognition result is received from the recognition device such as the camera EM1 and the latest recognition result is transmitted to the robot controller 400 by the sensing information processing unit 210, the robot controller 400 is not able to reflect the latest recognition result in various command values already generated.

In contrast, the control system 1 of the first embodiment illustrated in FIG. 2 can follow the movement of the object to be grasped on the basis of the latest recognition result and correct various command values. In this way, the control system 1 can achieve more robust stability as compared with the related control system 1Z. Furthermore, in a case where there is an update and the like of the OSS-utilization platform 200, the OS 300, or the software and the like of the external recognition devices EM1 to EM3, even when there is a change in the output form of the recognition result as a result of applying the update, it is possible to minimize an influence on the function of correcting various command values. Therefore, it is possible to achieve higher maintainability.

For example, when the image capturing section 212 is implemented by software provided by the manufacturer of the camera EM1, there is a possibility that the software for implementing the image capturing section 212 is updated and the output form or output frequency of the image capturing section 212 is changed. In such a case, the control device 100 may flexibly cope with the change in the output form or output frequency of the image capturing section 212 and may derive a feature amount according to the change by the image feature amount deriving section 214. Furthermore, the control device 100 may buffer the output form or output frequency of the image capturing section 212 by processing the output form or output frequency to a form before the change and derive the same feature amount as before the software update by the image feature amount deriving section 214. In this way, the control system 1 can achieve higher maintainability as compared with the related control system 1Z.

Figure 4:
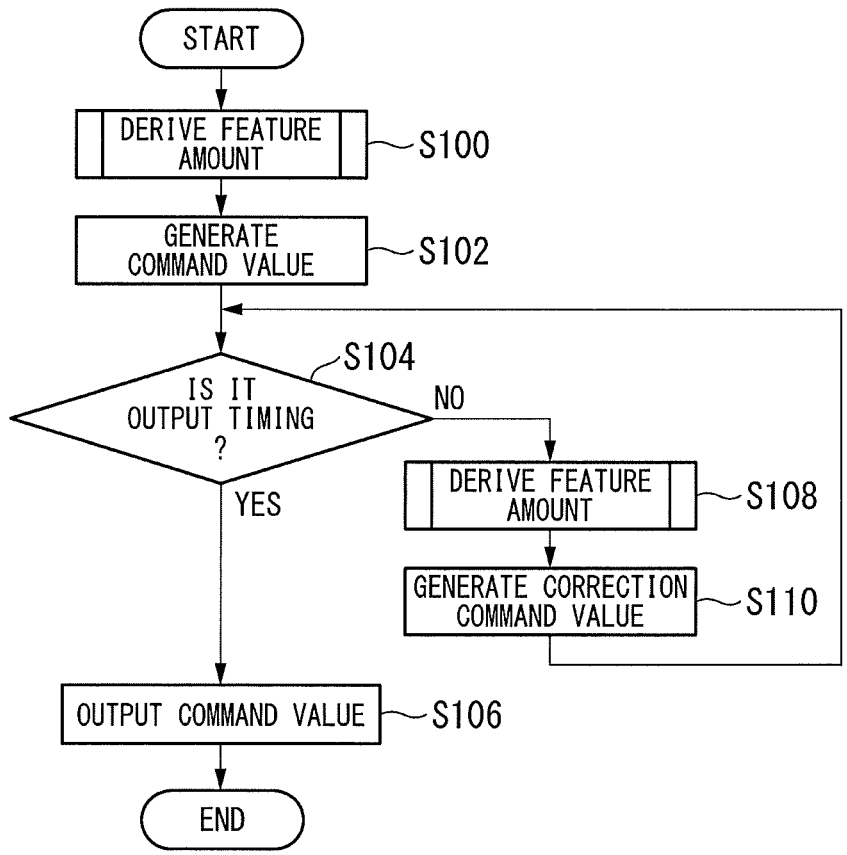
FIG. 4 is a flowchart illustrating an example of a processing flow of a control system 1.

FIG. 4 is a flowchart illustrating an example of a processing flow of the control system 1. The flowchart illustrated in FIG. 4, for example, is repeatedly executed at time intervals equal to predetermined time intervals, at which the command values are output to the robot arm device 600 by the robot controller 400, or time intervals shorter than the time intervals as a period.

The sensing information processing unit 210 derives a feature amount on the basis of a recognition result output by the external recognition device (step S100). Details thereof will be described later using FIG. 5. Next, the robot controller 400 generates the aforementioned various command value (step S102). Next, the determination unit 412 determines whether a timing for outputting the command value to the robot arm device 600 is reached (step S104). When it is determined that the output timing is reached, the robot controller 400 outputs the generated command value to the robot arm device 600 (step S106).

When it is determined in step S104 that the output timing is not reached, the robot controller 400 accepts various feature amounts based on new recognition results for the purpose of generation of a correction command value by the correction command value generation unit 414 (step S108). Next, the correction command value generation unit 414 generates the correction command value, outputs the generated correction command value to the target trajectory generation unit 406 and/or the motor command value generation unit 408, replaces the correction command value with the output command value (step S110), and then returns to the process of step S104. In this way, the procedure of the present flowchart is ended.

Figure 5:
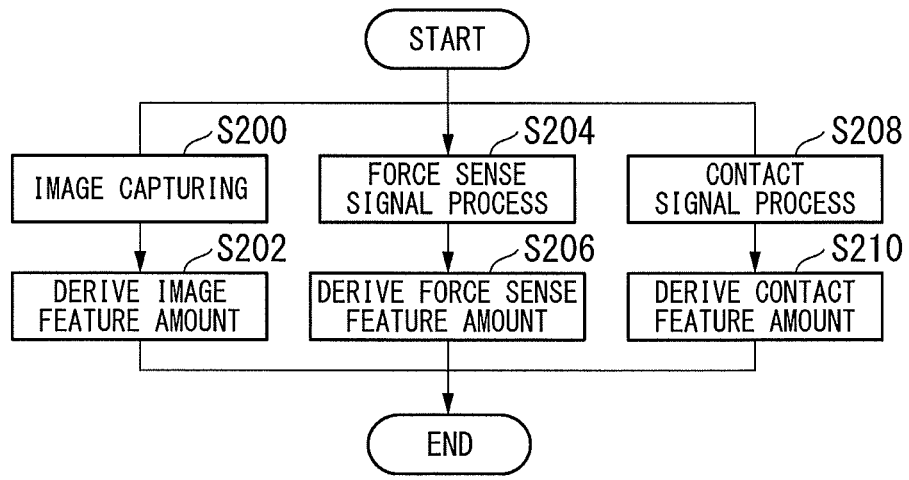
FIG. 5 is a flowchart illustrating an example of the flow of a feature amount derivation process.

FIG. 5 is a flowchart illustrating an example of the flow of the feature amount derivation processes of steps S100 and S108 of the flowchart of FIG. 4. In addition, the followings steps S200, S204, and S208 may be performed at the same time or at independent timings.

The image capturing section 212 receives imaging data output by the camera EM1 and outputs the imaging data to the image feature amount deriving section 214 (step S200). Next, the image feature amount deriving section 214 derives an image feature amount on the basis of the imaging data output by the image capturing section 212 and outputs the derived image feature amount to the robot controller 400 via the communication section 216 (step S202).

The force sense signal processing section 218 receives a recognition result output by the force sensor EM2 and outputs the recognition result to the force sense feature amount deriving section 220 (step S204). Next, the force sense feature amount deriving section 220 derives a force sense feature amount on the basis of the recognition result output by the force sense signal processing section 218 and outputs the derived force sense feature amount to the robot controller 400 via the communication section 216 (step S206).

The contact signal processing section 222 receives a contact recognition result output by the amplifier EM4 and outputs the contact recognition result to the contact feature amount deriving section 224 (step S208). Next, the contact feature amount deriving section 224 derives a contact feature amount on the basis of the recognition result output by the contact signal processing section 222 and outputs the derived contact feature amount to the robot controller 400 via the communication section 216 (step S210). In this way, the procedure of the present flowchart is ended.

According to the control system 1 of the first embodiment described above, when the sensing information processing unit 210 receives a recognition result from the recognition device such as the camera EM1, since it is determined by the determination unit 412 whether it is possible to generate a correction command value and the correction command value is generated by the correction command value generation unit 414 on the basis of the determination result of the determination unit 412, it is possible to output the correction command value based on the latest recognition result to the robot arm device 600, so that it is possible to achieve more robust stability and maintainability.

Second Embodiment

Next, a control system 1A of a second embodiment will be described. In the following description, elements having the same functions as the content described in the first embodiment are denoted by the same names and reference numerals, and a detailed description of the functions will be omitted. The same applies to other embodiments to be described later.

Figure 6:
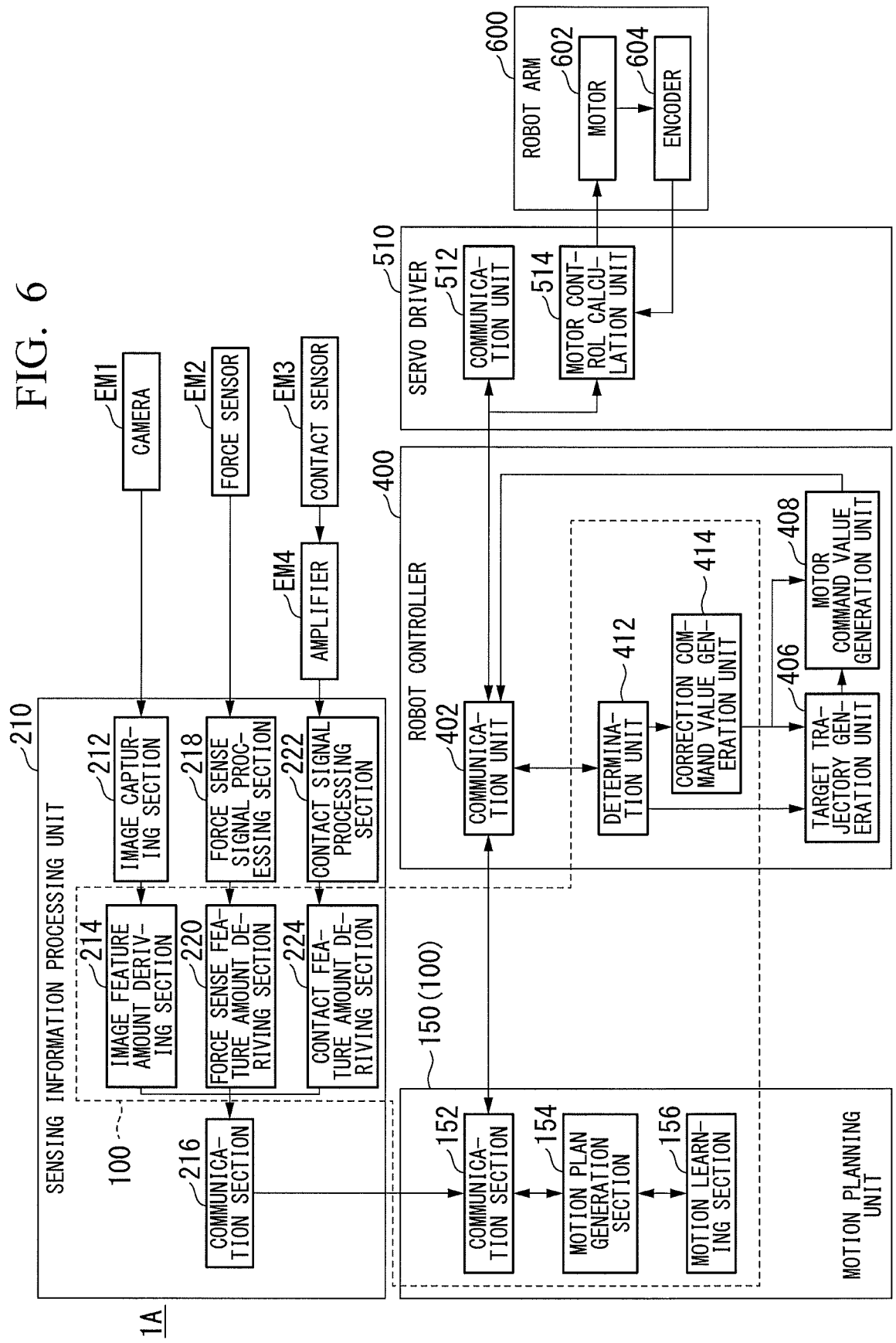
FIG. 6 is a block diagram illustrating an example of a configuration of a control system 1A of a second embodiment.

FIG. 6 is a block diagram illustrating an example of a configuration of the control system 1A of the second embodiment. The control system 1A of FIG. 6 is different from the control system 1 of FIG. 2 in that a motion planning unit 150 is further provided, the motion command generation unit 404 is removed, and the motor control calculation unit 410 is replaced with a servo driver 510. Consequently, the motion planning unit 150 and the servo driver 510 will be mainly described below. The motion planning unit 150, for example, is implemented by the middle-level software executed on the OSS-utilization platform 200 or the OS 300 illustrated in FIG. 1.

The motion planning unit 150, for example, includes a communication section 152, a motion plan generation section 154, and a motion learning section 156. The communication section 152 receives the image feature amount, the force sense feature amount, and the contact feature amount transmitted by the communication section 216 of the sensing information processing unit 210, and outputs the received feature amounts to the motion plan generation section 154. The motion plan generation section 154 generates a motion plan on the basis of various feature amounts output by the communication section 152. The motion plan is one or more motion commands to be executed by the robot arm device 600. The motion plan generation section 154, for example, generates a motion script similarly to the motion command generation unit 404 of FIG. 2. The motion plan generation section 154 outputs the generated motion plan to the motion learning section 156 and the communication section 152. The communication section 152 transmits the motion plan output by the motion plan generation section 154 to the robot controller 400. The communication from the communication section 152 to the robot controller 400, for example, is performed through the Ethernet via the OS 300 or the API provided by the OSS-utilization platform 200.

The motion learning section 156 stores and learns some or all of the motion plan output by the motion plan generation section 154. When storing and learning some of the motion plan, the motion learning section 156, for example, patternizes an arrangement between an object to be grasped and an obstacle by the camera EM1 and learns the pattern, thereby generating a decision rule of a motion plan related to the trajectory of the robot arm device 600. The motion plan generation section 154 determines whether a recognition result is suitable for the decision rule, and generates a motion plan on the basis of the decision rule when the recognition result is suitable for the decision rule. When the recognition result is not suitable for the decision rule, the motion plan generation section 154 generates a motion plan and stores the recognition result and the motion plan in the motion learning section 156. Furthermore, the decision rule stored in the motion learning section 156 is not limited to a rule related to the trajectory of the robot arm device 600 based on position information of the object to be grasped and the obstacle, and for example, may be a decision rule for deciding a grasping position of the grasping member from a contour line of the object to be grasped.

For example, the motion learning section 156 uses, as teacher data, a motion plan representing a normal motion plan set in advance by a user of the control system 1A, derives the degree of deviation between the motion plan output by the motion plan generation section 154 and basic learning data, and outputs the derived degree of deviation to the motion plan generation section 154. On the basis of the degree of deviation output by the motion learning section 156, the motion plan generation section 154 compensates the position accuracy of the generated motion plan.

The motor command value generation unit 408 of the robot controller 400 outputs a generated motor command value to the communication unit 402. The communication unit 402 outputs the motor command value output by the motor command value generation unit 408 to the servo driver 510. The communication from the communication unit 402 to the servo driver 510, for example, may be performed through the Ethernet via the OS 300 or the API provided by the OSS-utilization platform 200, or may be performed according to a communication standard prescribed by the manufacturer of the robot arm device 600; however, it is preferably performed according to the EthernetCAT standard.

A communication unit 512 of the servo driver 510 outputs the motor command value output by the communication unit 402 to a motor control calculation unit 514. On the basis of the motor command value output by the communication unit 512, the motor control calculation unit 514 calculates a command value for controlling the robot arm device 600 and outputs the calculated command value to the robot arm device 600. The communication unit 512 transmits a dedicated power signal (a motor driving current for controlling the driving of the motor 602) to the robot arm device 600.

In addition, the motion planning unit 150 is executed on the control device 100 of FIG. 1. The motion planning unit 150 may be implemented on the same processor as that in which the image feature amount deriving section 214, the force sense feature amount deriving section 220, and the contact feature amount deriving section 224 of the sensing information processing unit 210 are implemented, or may be implemented on the same processor as that in which the determination unit 412 and the correction command value generation unit 414 of the robot controller 400 are implemented.

Figure 7:
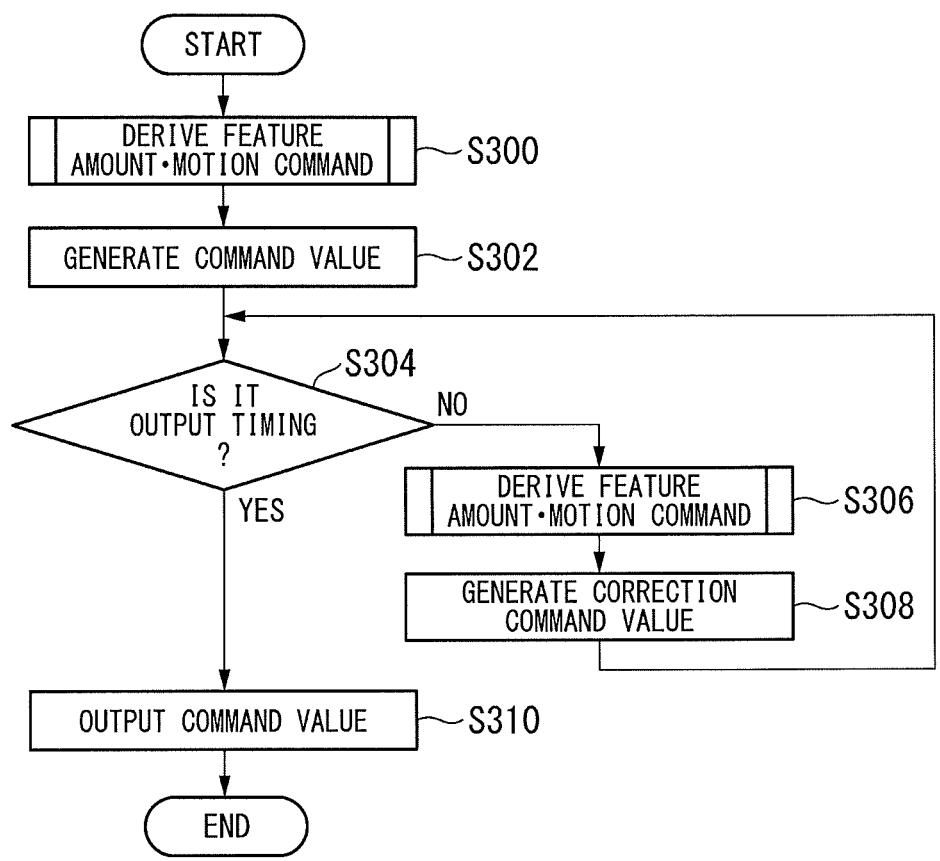
FIG. 7 is a flowchart illustrating an example of a processing flow of a control system 1A.

FIG. 7 is a flowchart illustrating an example of a processing flow of the control system 1A. The process of step S304 is identical to that of step S104 in the flowchart of FIG. 4. Furthermore, the process of step S310 is identical to that of step S106 in the flowchart of FIG. 4. Consequently, steps S300, S302, S306, and S308 will be described below.

The motion planning unit 150 generates a motion plan on the basis of various feature amounts transmitted by the sensing information processing unit 210 (step S300). Details thereof will be described later using FIG. 8. Next, the robot controller 400 generates a command value on the basis of the motion plan (step S302).

When it is determined in step S304 that the output timing is not reached, the robot controller 400 accepts various feature amounts based on new recognition results for the purpose of generation of a correction command value by the correction command value generation unit 414 (step S306). Next, the correction command value generation unit 414 generates the correction command value, outputs the generated correction command value to the target trajectory generation unit 406 or the motor command value generation unit 408, replaces the correction command value with the output command values (step S308), and then returns to the process of step S304. In this way, the procedure of the present flowchart is ended.

Figure 8:
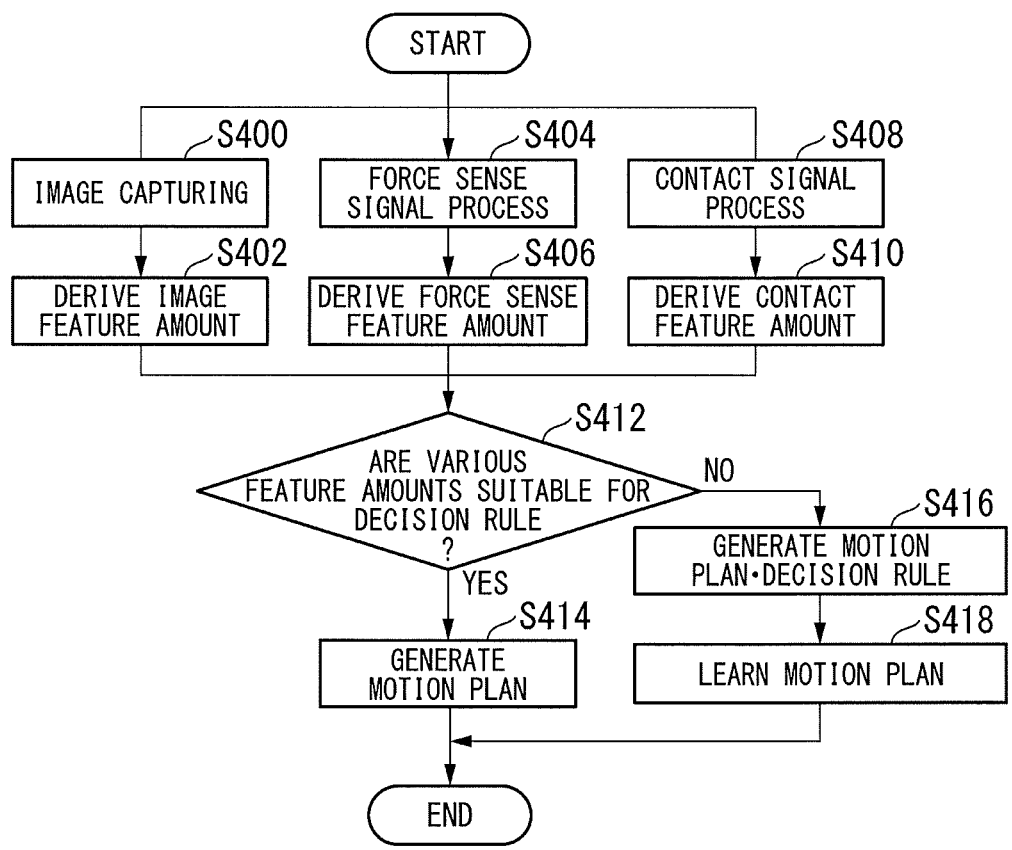
FIG. 8 is a flowchart illustrating an example of the flow of a feature amount derivation process and a motion plan learning process in a control system 1A.

FIG. 8 is a flowchart illustrating an example of the flow of the feature amount derivation process and the motion plan learning process in the control system 1A. The processes of steps S400, S402, S404, S406, S408, and S410 are identical to those of steps S200, S202, S204, S206, S208, and S210 in the flowchart of FIG. 5. Furthermore, the flowchart of FIG. 8 is different from that of FIG. 5 in that steps S412, S414, S416, and S418 are added. Consequently, steps S412, S414, S416, and S418 will be described below.

After the processes of steps S402, S406, and S410, the motion plan generation section 154 determines whether various feature amounts are suitable for the decision rule (S412). When it is determined that various feature amounts are suitable for the decision rule, the motion plan generation section 154 generates a motion plan on the basis of various feature amounts output by the communication section 152 and the decision rule (S414). When it is determined that various feature amounts are not suitable for the decision rule, the motion plan generation section 154 generates a motion plan and a rule on the basis of various feature amounts output by the communication section 152 (S416). Next, the motion plan is learned (S418). In this way, the procedure of the present flowchart is ended.

According to the control system 1A of the second embodiment described above, in addition to the same effects as those of the first embodiment, the motion learning section 156 stores a decision rule derived from various feature amounts and the motion plan generation section 154 generates a motion plan on the basis of the decision rule of the motion plan stored by the motion learning section 156, so that it is possible to improve the generation accuracy of a correction command value.

Third Embodiment

Next, a control system 1B of a third embodiment will be described.

Figure 9:
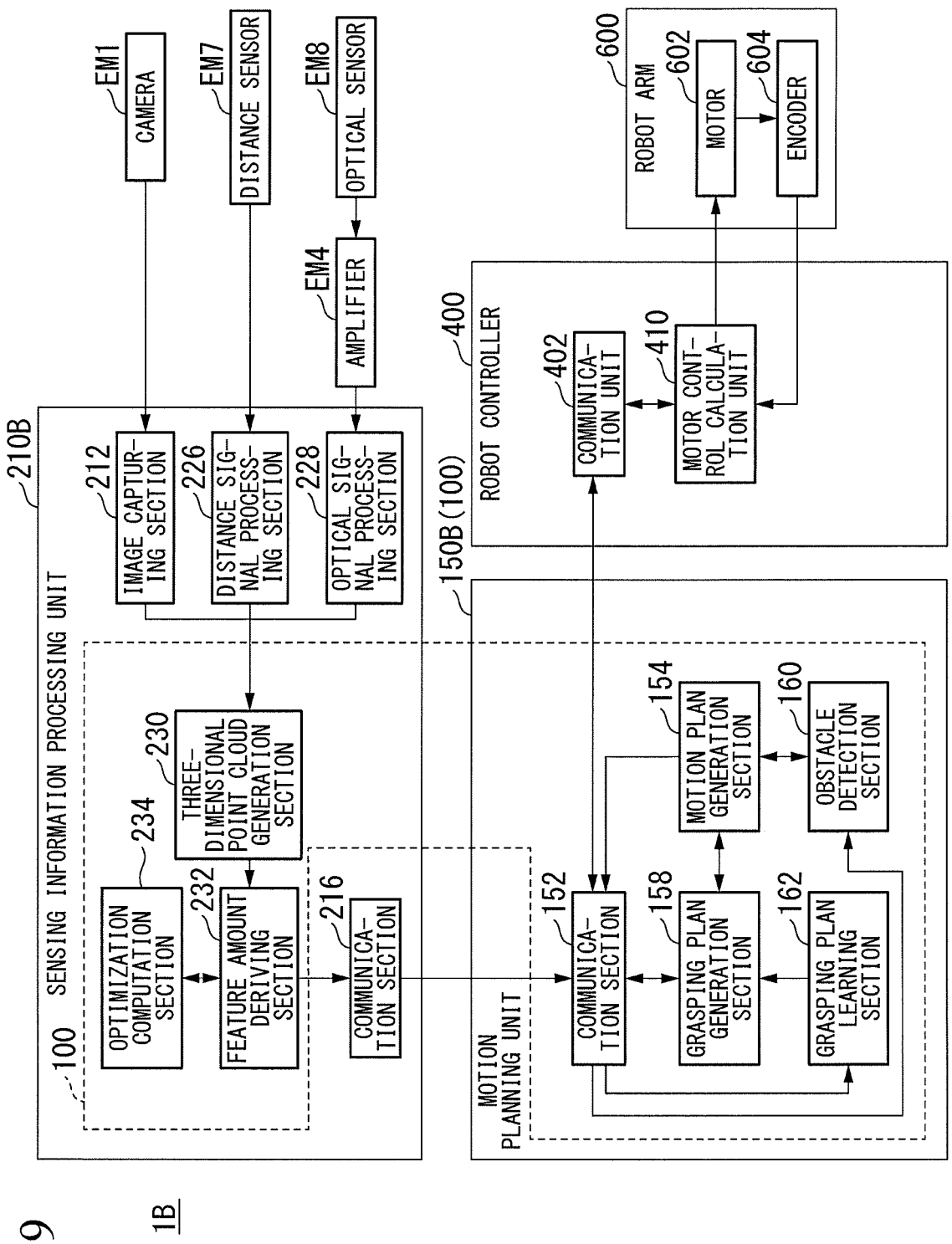
FIG. 9 is a block diagram illustrating an example of a configuration of a control system 1B of a third embodiment.

FIG. 9 is a block diagram illustrating an example of a configuration of the control system 1B of the third embodiment. The control system 1B of FIG. 9 is different from the control system 1A of FIG. 6 in terms of a distance sensor EM7, an optical sensor EMB, elements of a sensing information processing unit 210B, and elements of a motion planning unit 150B. Consequently, the difference with the control system 1A will be mainly described below. A three-dimensional point cloud generation section 230, a feature amount deriving section 232, and an optimization computation section 234 are implemented by the upper-level software executed on the OSS-utilization platform 200 illustrated in FIG. 1.

The distance sensor EM7, for example, is installed at the distal end and the like of the grasping member of the robot arm device 600 and measures a distance between an object to be grasped recognized by the camera EM1 and the grasping member of the robot arm device 600 at a measurement timing. The distance sensor EM7 transmits a measurement result to a distance signal processing section 226. For example, when the camera EM1 collects visible rays and generates imaging data, the optical sensor EM8 generates imaging data with light rays (for example, near infrared rays, short wavelength infrared rays, thermal infrared rays and the like) different from those of the camera EM1. The camera EM1 and the optical sensor EM8 may be used together in order to recognize the object to be grasped, or may be used for other purposes such that the camera EM1 is caused to recognize the object to be grasped by the robot arm device 600 and the optical sensor EM8 is caused to recognize an obstacle other than the object to be grasped. Furthermore, when the optical sensor EM8 is caused to recognize the object to be grasped, the optical sensor EM8 is installed at a position different from that of the camera EM1, so that it is possible to derive a three-dimensional measurement result of the object to be grasped from recognition results of the camera EM1 and the optical sensor EM8. The optical sensor EM8 transmits the recognition result to an optical signal processing section 228 via the amplifier EM4.

The sensing information processing unit 210B is different from the sensing information processing unit 210 of FIG. 2 and FIG. 6 in that the force sense signal processing section 218 and the contact signal processing section 222 have been replaced with the distance signal processing section 226 and the optical signal processing section 228. Furthermore, the sensing information processing unit 210B is different from the sensing information processing unit 210 of FIG. 2 in that the three-dimensional point cloud generation section 230, the feature amount deriving section 232, and the optimization computation section 234 are further provided. The three-dimensional point cloud generation section 230, the feature amount deriving section 232, and the optimization computation section 234 are another example of the upper-level software, and the motion planning unit 150B is another example of the middle-level software and the lower-level software.

The distance signal processing section 226 derives a distance between the object to be grasped and the grasping member of the robot arm device 600 on the basis of the measurement result transmitted by the distance sensor EM7, and outputs the derived distance to the three-dimensional point cloud generation section 230. The optical signal processing section 228 outputs some or all of the recognition result of the optical sensor EM8 for the object to be grasped or the obstacle, which has been output by the amplifier EM4, to the three-dimensional point cloud generation section 230.

On the basis of the recognition result output by the image capturing section 212, the measurement result output by the distance signal processing section 226, and the recognition result output by the optical signal processing section 228, the three-dimensional point cloud generation section 230 generates three-dimensional point cloud data indicating a movable path of the robot arm device 600. The three-dimensional point cloud generation section 230 outputs the generated three-dimensional point cloud data to the feature amount deriving section 232.

The feature amount deriving section 232 analyzes the three-dimensional point cloud data output by the three-dimensional point cloud generation section 230, and derives a three-dimensional feature amount indicating information on the size, area, position, approximate center and the like of the object to be grasped. The feature amount deriving section 232 transmits the derived three-dimensional feature amount to the motion planning unit 150B via the communication section 216. Furthermore, the feature amount deriving section 232 outputs the derived three-dimensional feature amount to the optimization computation section 234.

The feature amount deriving section 232 may derive the three-dimensional feature amount by using a single feature amount derivation method, or may output a derivation result of a three-dimensional feature amount, which is determined to have the highest accuracy, to the optimization computation section 234 by comparing a result obtained by deviating a three-dimensional feature amount by using a plurality of feature amount derivation methods and removing noise or evaluating the derivation accuracy of the three-dimensional feature amount by itself.

The optimization computation section 234 stores the three-dimensional feature amount output by the feature amount deriving section 232 and adjusts parameters and the like used for deriving the three-dimensional feature amount. The optimization computation section 234 may store some or all of the three-dimensional point cloud data output by the three-dimensional point cloud generation section 230.

The three-dimensional point cloud generation section 230, the feature amount deriving section 232, and the optimization computation section 234 are executed on the control device 100 of FIG. 1.

The motion planning unit 150B is different from the motion planning unit 150 of FIG. 6 in that a grasping plan generation section 158, an obstacle detection section 160, and a grasping plan learning section 162 are provided.

The grasping plan generation section 158 generates a grasping plan of the object to be grasped on the basis of the three-dimensional feature amount received from the sensing information processing unit 210B via the communication section 152. The grasping plan, for example, includes a plan of a position and force in/by which the robot arm device 600 grasps the object to be grasped, and a grasping orientation of the robot arm device 600 itself. The grasping plan generation section 158 outputs the generated grasping plan to the motion plan generation section 154 and the grasping plan learning section 162.

The obstacle detection section 160 detects the obstacle on the basis of the three-dimensional feature amount received from the sensing information processing unit 210B via the communication section 152, and generates position information of the detected obstacle. The obstacle detection section 160 outputs the generated position information of the obstacle to the motion plan generation section 154.

The motion plan generation section 154 generates a motion plan of the robot arm device 600 on the basis of the grasping plan output by the grasping plan generation section 158 and the position information of the obstacle output by the obstacle detection section 160. The motion plan generation section 154 transmits the generated motion plan to the robot controller 400 via the communication section 152.

The grasping plan learning section 162 stores and learns some or all of the motion plan output by the motion plan generation section 154. For example, when the shapes and the like of objects to be grasped of the robot arm device 600 are similar to each other, the grasping plan learning section 162 may extract only the grasping plan output by the grasping plan generation section 158 from the motion plan and store/learn the extracted grasping plan. Furthermore, for example, when the position of the obstacle is hardly changed, the grasping plan learning section 162 may extract only the position information of the obstacle output by the obstacle detection section 160 and store/learn the extracted position information. The grasping plan learning section 162, for example, patternizes an arrangement and the like between the object to be grasped and the obstacle and learns the pattern, thereby generating a decision rule of a grasping plan related to the trajectory of the robot arm device 600. The grasping plan learning section 162 outputs a decision rule for generating the motion plan to the motion plan generation section 154. When it is suitable for the pattern of the decision rule output by the grasping plan learning section 162, the motion plan generation section 154 generates a motion plan on the basis of the decision rule. Furthermore, the grasping plan learning section 162 outputs a decision rule for generating the grasping plan to the grasping plan generation section 158. When it is suitable for the pattern of the decision rule output by the grasping plan learning section 162, the grasping plan generation section 158 generates a grasping plan on the basis of the decision rule.

In addition, the motion planning unit 150B is executed on the control device 100 of FIG. 1. The motion planning unit 150B, for example, is implemented on a processor different from that in which the three-dimensional point cloud generation section 230, the feature amount deriving section 232, and the optimization computation section 234 are implemented.

Figure 10:
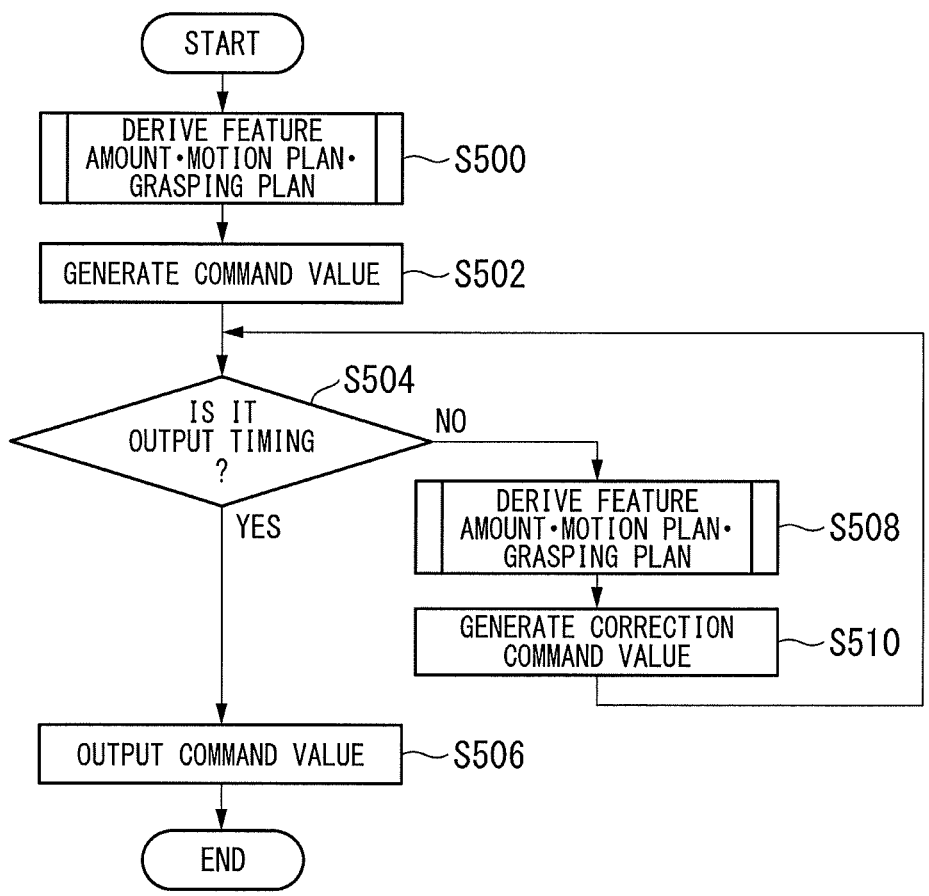
FIG. 10 is a flowchart illustrating an example of a processing flow of a control system 1B.

FIG. 10 is a flowchart illustrating an example of a processing flow of the control system 1B. The processes of steps S502, S504, and S506 are identical to those of steps S302, S304, and S310 in the flowchart of FIG. 7. Furthermore, the process of step S510 is identical to that of step S308 in the flowchart of FIG. 7. The flowchart of FIG. 10 is different from that of FIG. 7 in terms of a processing set indicating steps S500 and S508. Consequently, the processing set of steps S500 and S508 will be described below using a flowchart of FIG. 11.

Figure 11:
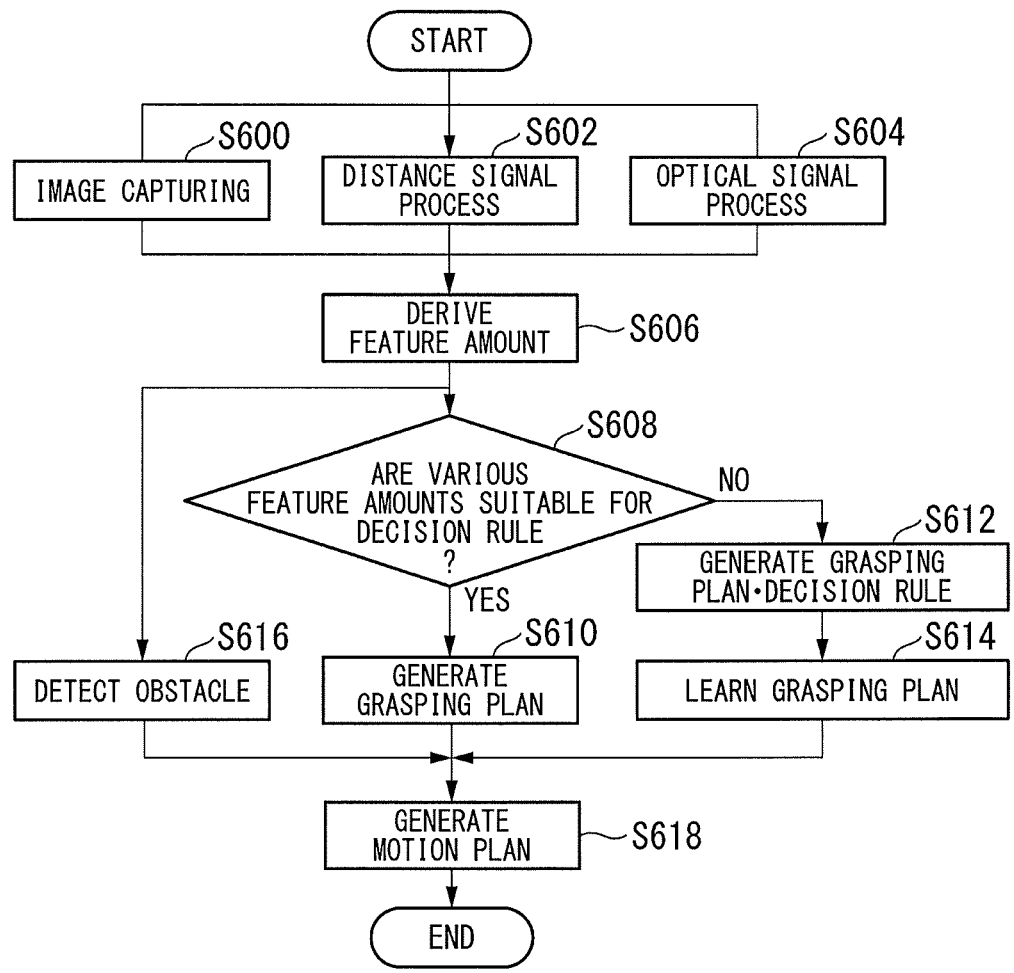
FIG. 11 is a flowchart illustrating an example of the flow of a feature amount derivation process and a motion plan learning process in a control system 1B.

FIG. 11 is a flowchart illustrating an example of the flow of the feature amount derivation process and the motion plan learning process in the control system 1B. The processes of step S600 is identical to that of step S400 in the flowchart of FIG. 8. Furthermore, the processes of step S608 is identical to that of step S412 in the flowchart of FIG. 8. Furthermore, the processes of step S618 is identical to that of step S414 in the flowchart of FIG. 8. The flowchart of FIG. 11 is different from that of FIG. 8 in that steps S602, S604, S606, S610, S612, S614, and S616 are added. Consequently, steps S602, S604, S606, S610, S612, S614, and S616 will be mainly described below. In addition, the following steps S600, S602, and S604 may be performed at the same time or at independent timings.

The distance signal processing section 226 derives a distance between the object to be grasped and the grasping member of the robot arm device 600 on the basis of the measurement result transmitted by the distance sensor EM7, and outputs the derived distance to the three-dimensional point cloud generation section 230 (step S602). Furthermore, the optical signal processing section 228 outputs the recognition result of the optical sensor EM8 for the object to be grasped or the obstacle to the three-dimensional point cloud generation section 230 (step S604). After the processes of steps S600, S602, and S604, the three-dimensional point cloud generation section 230 generates three-dimensional point cloud data indicating a movable path of the robot arm device 600 (step S606).

When it is determined in step S608 that the three-dimensional point cloud data is suitable for the decision rule, the grasping plan generation section 158 generates a grasping plan on the basis of the decision rule (step S610). Furthermore, when it is determined in step S608 that the three-dimensional point cloud data is not suitable for the decision rule, the grasping plan generation section 158 generates a grasping plan (step S612) and causes the grasping plan learning section 162 to learn the generated grasping plan (step S614). After the process of step S614, the obstacle detection section 160 detects an obstacle (step S616).

After the processes of steps S610, S614, and S616, the motion plan generation section 154 performs the processes of step S618. In this way, the procedure of the present flowchart is ended.

According to the control system 1B of the third embodiment described above, in addition to the same effects as those of the first embodiment and the second embodiment, the obstacle detection section 160 detects an obstacle, the grasping plan learning section 162 stores a decision rule of a grasping plan derived from a three-dimensional feature amount, and the motion plan generation section 154 generates a motion plan on the basis of the obstacle detection result of the obstacle detection section 160 and the decision rule of the grasping plan stored in the grasping plan learning section 162, so that it is possible to further improve the generation accuracy and generation performance of the grasping plan and the motion plan.

Fourth Embodiment

Next, a control system 1C of a fourth embodiment will be described.

Figure 12:
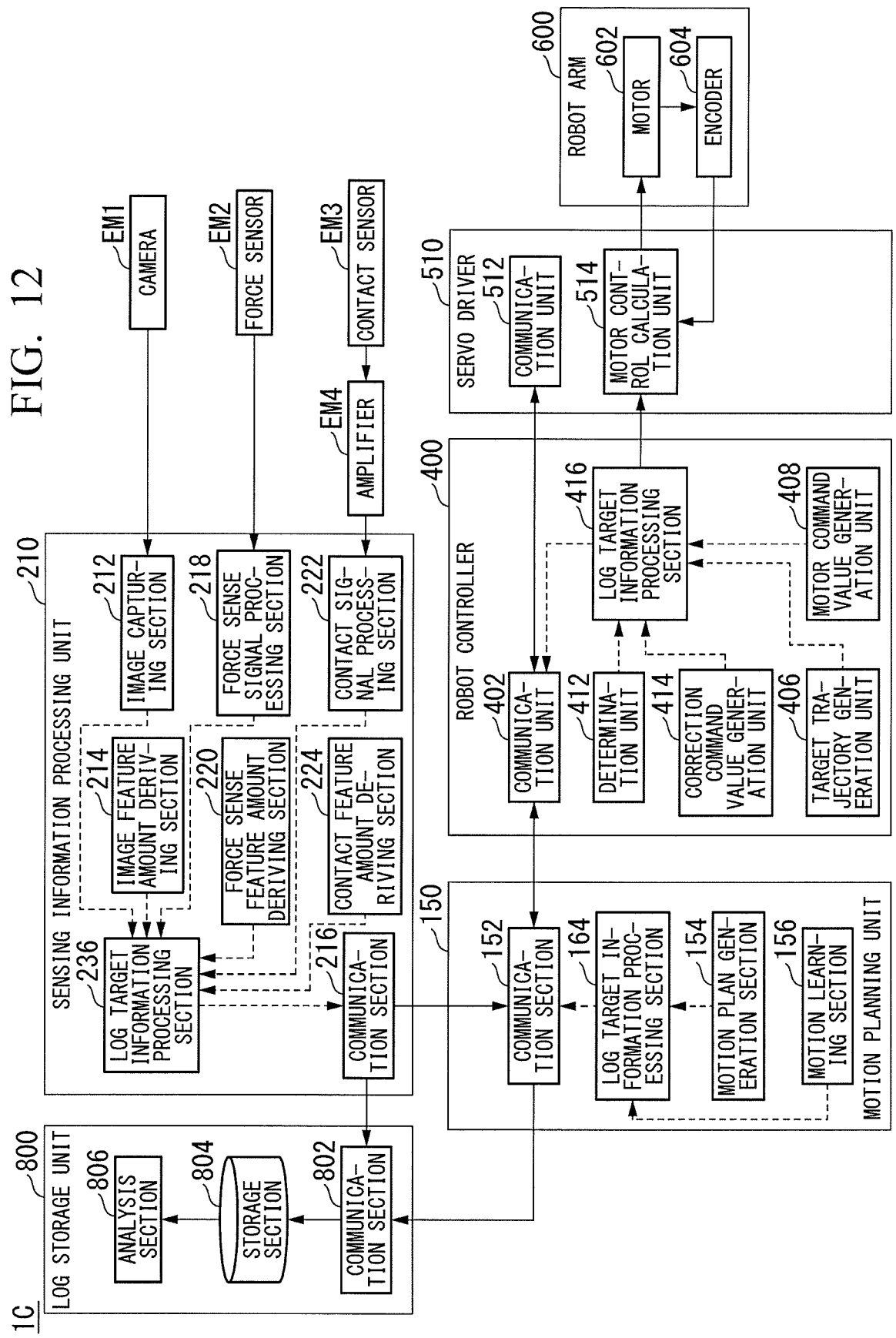
FIG. 12 is a block diagram illustrating an example of a configuration of a control system 1C of a fourth embodiment.

FIG. 12 is a block diagram illustrating an example of a configuration of the control system 1C of the fourth embodiment. The configuration illustrated in FIG. 12 is different from that of the control system 1A illustrated in FIG. 6 in that a log storage unit 800 is further provided. The log storage unit 800 is implemented by the upper-level software executed on the OSS-utilization platform 200 illustrated in FIG. 1. Consequently, the log storage unit 800 will be mainly described below.

The log storage unit 800, for example, includes a communication section 802, a storage section 804, and an analysis section 806. The communication section 802 receives log information, which is output from a log target information processing section 236 of the sensing information processing unit 210, a log target information processing section 164 of the motion planning unit 150, and a log target information processing section 416 of the robot controller 400 of the control system 1C. The communication section 802 stores the received log information in the storage section 804. The log storage unit 800, for example, is implemented by executing the upper-level software of the control device 100. The log target information processing section 236, the log target information processing section 164, and the log target information processing section 416 are an example of a "log processing section". The analysis section 806 analyzes the log information stored in the storage section 804 at a predetermined interval (for example, several hours to once a day) and determines whether there is a predetermined tendency. The predetermined tendency, for example, is a tendency of deterioration of consumable parts or a tendency of parts failure. When it is determined that there is the predetermined tendency, the analysis section 806 may display a determination result on a display device of the control system 1C or may notify an administrator of the control system 1C of the determination result by using a method (for example, a mail and the like) set in advance.

The log information, which is output from the log target information processing section 236 of the sensing information processing unit 210, the log target information processing section 164 of the motion planning unit 150, and the log target information processing section 416 of the robot controller 400, for example, includes information regarding whether the log information is log information output as which type of log from which device at which timing.

Furthermore, the output level of the log information can be set in accordance with a log urgency level or a usage level, and the setting of the output level is variable by the administrator of the control system 1C such as output of only a minimum log and output of all collectable log information. For example, some or all of a processing log is output to the log target information processing section 236 of the sensing information processing unit 210 from the image capturing section 212 and the image feature amount deriving section 214. The log target information processing section 236 processes and extracts a part related to information to be used for analyzing a predetermined tendency from processing log information, and outputs the processed and extracted log information to the communication section 216. Similarly, some or all of a processing log is output to the log target information processing section 236 from the force sense signal processing section 218, the force sense feature amount deriving section 220, the contact signal processing section 222, and the contact feature amount deriving section 224, and the log target information processing section 236 processes and extracts a part related to information to be used for analyzing a predetermined tendency from processing log information, and outputs the processed and extracted log information to the communication section 216. The communication section 216 transmits the processed and extracted log information to the communication section 802 of the log storage unit 800.

Similarly to the log target information processing section 236, some or all of a processing log is output to the log target information processing section 164 of the motion planning unit 150 from the motion plan generation section 154 and the motion learning section 156. The log target information processing section 164 processes and extracts a part related to information to be used for analyzing a predetermined tendency from processing log information, and outputs the processed and extracted log information to the communication section 152. The communication section 152 transmits the processed and extracted log information to the communication section 802 of the log storage unit 800.

Furthermore, some or all of a processing log is output to the log target information processing section 416 of the robot controller 400 from the target trajectory generation unit 406, the motor command value generation unit 408, the determination unit 412, and the correction command value generation unit 414. The log target information processing section 416 processes and extracts a part related to information to be used for analyzing a predetermined tendency from processing log information, and outputs the processed and extracted log information to the communication unit 402. The communication section 402 transmits the processed and extracted log information to the communication section 802 of the log storage unit 800.

Figure 13:
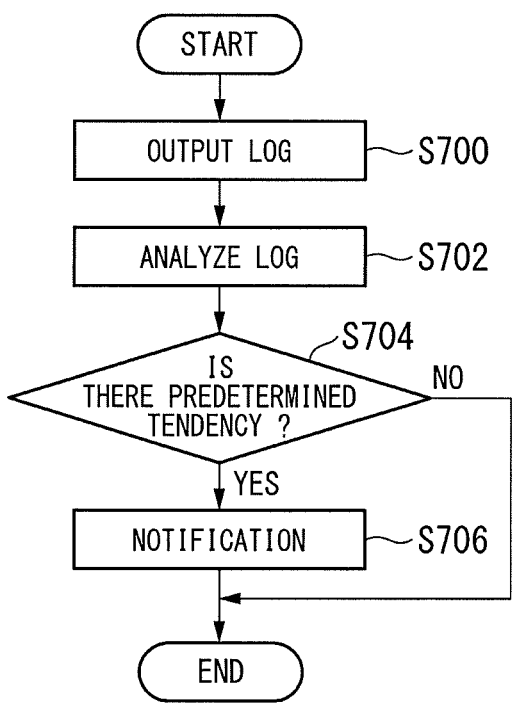
FIG. 13 is a flowchart illustrating an example of the flow of a log collection process of a log storage unit 800 of a control system 1C.

FIG. 13 is a flowchart illustrating an example of the flow of the log collection process of the log storage unit 800 of the control system 1C.

Firstly, the communication section 802 receives the log information, which is output from the log target information processing section 236 of the sensing information processing unit 210, the log target information processing section 164 of the motion planning unit 150, and the log target information processing section 416 of the robot controller 400, and stores the received log information in the storage section 804 (S700). Next, the analysis section 806 analyzes the log information stored in the storage section 804 (S702). The analysis section 806 determines whether there is a predetermined tendency as a result of analyzing the log information stored in the storage section 804 (S704). When it is determined that there is the predetermined tendency, the analysis section 806 may notify the administrator of the control system 1C of the determination result (S706) and ends the procedure. When it is determined that there is no predetermined tendency, the analysis section 806 ends the procedure of the present flowchart.

According to the control system 1C of the fourth embodiment described above, in addition to the same effects as those of the first embodiment, the second embodiment, and the third embodiment, since the analysis section 806 analyzes the log information of the control system 1C stored in the storage section 804 and determines whether there is a predetermined tendency, a tendency and the like of deterioration of consumable parts or failure are detected, so that it is possible to achieve higher maintainability.

In the aforementioned description, although an example in which a control target of the control device 100 is the robot arm device 600 has been described, the control target of the control device 100 may be other autonomous mechanisms, for example, moving objects (moving objects that autonomously travel, moving objects that autonomously fly, and the like).

According to at least one embodiment described above, two or more processors are provided, and between a first processor and a second processor that implement the control device 100 that controls the robot controller 400 for controlling an autonomous motion mechanism such as the robot arm device 600 on the basis of a recognition result received from a recognition device such as the camera EM1, the first processor executes the upper-level software executed by the sensing information processing unit 210 and deriving a feature amount representing a feature of the recognition result of the camera EM1 and the like, the robot controller 400 of the second processor executes the lower-level software that outputs a command value for controlling the robot arm device 600 on the basis of a motion plan, and any one of the first processor and the second processor executes the middle-level software that generates the motion plan on the basis of the feature amount derived by the sensing information processing unit 210, so that it is possible to achieve more robust stability and maintainability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device, which includes at least two processors comprising at least a first processor and a second processor and controls at least one autonomous motion mechanism on the basis of a recognition result received from a recognition device, wherein
a storage device stores upper-level software for deriving a feature amount representing a feature of the recognition result, middle-level software for generating a motion plan of the autonomous motion mechanism on the basis of the feature amount, and lower-level software for outputting a command value for controlling the autonomous motion mechanism on the basis of the motion plan,
the first processor executes at least the upper-level software,
the second processor executes at least the lower-level software, and
at least one processor included in the control device executes the middle-level software, and
the lower-level software allows the second processor to serve as:
a command value generation unit that outputs a lower-level command value for controlling the autonomous motion mechanism on the basis of the motion plan;
a control unit that determines to generate a correction command value of the command value, which includes a correction direction or correction amount of the command value, when the command value is not output to the autonomous motion mechanism yet after the command value generation unit has generated the command value; and
a correction command value generation unit that generates, when the correction command value is determined to be generated, the correction command value on the basis of a feature amount that is based on a new recognition result obtained by the recognition device, and
the feature amount includes an image feature amount, a force sense feature amount, and a contact feature amount, the image feature amount being derived based on imaging data output by a camera, the force sense feature amount being derived based on a recognition result output by a force sensor, the contact feature amount being derived based on a contact recognition result output by an amplifier.

2. The control device according to claim 1, wherein the control device controls a robot controller that controls the autonomous motion mechanism.

3. The control device according to claim 2, wherein the upper-level software allows the first processor to serve as an accepting unit that accepts the recognition result and a feature amount deriving section that derives the feature amount of the recognition result on the basis of the recognition result, and
the middle-level software allows the at least one processor to serve as a motion planning unit that generates the motion plan of the autonomous motion mechanism on the basis of the feature amount.

4. The control device according to claim 3, wherein the middle-level software allows the at least one processor included in the control device to further serve as a motion learning section that stores and learns the recognition result and some or all of the motion plan.

5. The control device according to claim 3, wherein, when the autonomous motion mechanism includes a grasping member, the middle-level software allows the at least one processor included in the control device to further serve as a grasping plan generation section that generates a plan of a grasping motion performed by the grasping member of the autonomous motion mechanism, on the basis of the recognition result, and a grasping plan learning section that stores and learns the plan of the grasping motion generated by the grasping plan generation section.

6. The control device according to claim 3, wherein the upper-level software is executed to allow the first processor to further serve as a log processing section that outputs a record of a processing result of at least the robot controller and a generation result of the correction command value generated by the correction command value generation unit, and a log storage unit that stores the record output by the log processing section.

7. The control device according to claim 3, wherein the upper-level software allows the first processor to process, when an output form is changed due to update of software, the output form to a form before the change and derive the same feature amount as before the update of software by the feature amount deriving section.

8. A control method of at least one autonomous motion mechanism by a control device, which includes at least two processors comprising at least a first processor and a second processor, controls the autonomous motion mechanism on the basis of a recognition result received from a recognition device, and stores upper-level software, middle-level software, and lower-level software in a storage device, comprising the steps of:
  deriving a feature amount representing a feature of the recognition result by execution of the upper-level software by the first processor;
  generating a motion plan of the autonomous motion mechanism on the basis of the feature amount by execution of the middle-level software by at least one of the two processors included in the control device;
  outputting a command value for controlling the autonomous motion mechanism on the basis of the motion plan by execution of the lower-level software by the second processor;
  outputting a lower-level command value for controlling the autonomous motion mechanism on the basis of the motion plan;
  generating a correction command value of the command value, which includes a correction direction or correction amount of the command value, when the command value is not output to the autonomous motion mechanism yet after the command value has been generated; and
  generating, when the correction command value is determined to be generated, the correction command value on the basis of a feature amount that is based on a new recognition result obtained by the recognition device,
  wherein the feature amount includes an image feature amount, a force sense feature amount, and a contact feature amount, the image feature amount being derived based on imaging data output by a camera, the force sense feature amount being derived based on a recognition result output by a force sensor, the contact feature amount being derived based on a contact recognition result output by an amplifier.

9. A computer-readable non-transitory storage medium, which stores programs executed in a control device including at least two processors comprising at least a first processor and a second processor and controlling at least one autonomous motion mechanism on the basis of a recognition result received from a recognition device, wherein the programs comprise:
  an upper-level program that is executed by the first processor and derives a feature amount representing a feature of the recognition result;
  a middle-level program that is executed by the at least one of the two processors included in the control device and generates a motion plan of the autonomous motion mechanism on the basis of the feature amount;
  a lower-level program that is executed by the second processor and outputs a command value for controlling the autonomous motion mechanism on the basis of the motion plan;
  a command value generation program that is executed by the second processor and outputs a lower-level command value for controlling the autonomous motion mechanism on the basis of the motion plan;
  a control program that is executed by the second processor and determines to generate a correction command value of the command value, which includes a correction direction or correction amount of the command value, when the command value is not output to the autonomous motion mechanism yet after the command value has been generated; and
  a correction command value generation program that is executed by the second processor and generates, when the correction command value is determined to be generated, the correction command value on the basis of a feature amount that is based on a new recognition result obtained by the recognition device,
  wherein the feature amount includes an image feature amount, a force sense feature amount, and a contact feature amount, the image feature amount being derived based on imaging data output by a camera, the force sense feature amount being derived based on a recognition result output by a force sensor, the contact feature amount being derived based on a contact recognition result output by an amplifier.

* * * * *